United States Patent
Medina, III et al.

(10) Patent No.: US 11,049,186 B1
(45) Date of Patent: Jun. 29, 2021

(54) SYSTEMS AND METHODS FOR RECORDING AN ACCIDENT

(71) Applicant: UNITED SERVICES AUTOMOBILE ASSOCIATION (USAA), San Antonio, TX (US)

(72) Inventors: Reynaldo Medina, III, San Antonio, TX (US); Charles L. Oakes, III, Boerne, TX (US); Michael P. Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/213,262

(22) Filed: Dec. 7, 2018

Related U.S. Application Data

(63) Continuation of application No. 14/066,336, filed on Oct. 29, 2013, now abandoned, which is a continuation of application No. 12/099,447, filed on Apr. 8, 2008, now Pat. No. 8,571,895.

(51) Int. Cl.
    *G06Q 40/08* (2012.01)

(52) U.S. Cl.
    CPC .................... *G06Q 40/08* (2013.01)

(58) Field of Classification Search
    CPC ........ G06Q 10/10; G06Q 40/08; G07C 5/008; G06F 17/00; G08G 1/16
    USPC ............................................................ 705/4
    See application file for complete search history.

(56) References Cited

U.S. PATENT DOCUMENTS

| | | | | |
|---|---|---|---|---|
| 6,741,168 B2* | 5/2004 | Webb | ..................... | G07C 5/008 180/271 |
| 8,965,677 B2* | 2/2015 | Breed | ..................... | G01S 19/42 701/301 |
| 2003/0233261 A1* | 12/2003 | Kawahara | .............. | G06Q 10/10 705/4 |

* cited by examiner

*Primary Examiner* — Clifford B Madamba
(74) *Attorney, Agent, or Firm* — Baker & Hostetler, LLP

(57) ABSTRACT

The described embodiments contemplate a system, method and computer readable medium with computer-executable instructions for recording information relating to an accident. In one exemplary and non-limiting embodiment, once an accident is detected, a storage file is created, and information relating to the accident is stored in the storage file. In another exemplary and non-limiting embodiment, an insurance company may process a claim by receiving a notification that an accident has occurred, transmitting a request to record information relating to the accident, receiving the information, establishing an accident record, and processing an insurance claim. In another exemplary and non-limiting embodiment, an accident is detected, primary accident information is transmitted from a first recording device, a communication link is established between the first recording device and a second recording device, and a request is transmitted to the second recording device to transmit secondary accident information.

20 Claims, 8 Drawing Sheets

SYSTEMS AND METHODS FOR RECORDING AN ACCIDENT

CROSS-REFERENCE TO RELATED APPLICATIONS

This application is a continuation of U.S. patent application Ser. No. 14/066,336 filed on Oct. 29, 2014, which is a continuation of U.S. patent application Ser. No. 12/099,447, filed Apr. 8, 2008, now U.S. Pat. No. 8,571,895, and is related by subject matter to the subject matter disclosed in the following commonly assigned applications, the entirety of which are hereby incorporated by reference herein: U.S. patent application Ser. No. 12/099,414, filed Apr. 8, 2008, and U.S. patent application Ser. No. 12/099,477, filed Apr. 8, 2008. In addition, the subject matter described herein relates to the subject matter described in U.S. patent application Ser. No. 12/098,562; U.S. patent application Ser. No. 12/098,589; and U.S. patent application Ser. No. 12/098,667, each filed on Apr. 7, 2008 and each entitled "Systems and Methods for Automobile Accident Claims Initiation."

BACKGROUND

An automobile accident is a dynamic event, one in which information leading up to the event may be as important as the resulting accident. Further, as time progresses after the accident, it may be difficult for victims and witnesses of accidents to accurately recount the events leading up to, during, and subsequent to an automobile accident. Additionally, maintaining evidence at the accident may be difficult. For example, in order to let traffic flow again, police may need to perform an expedited investigation and require the removal of potential accident scene evidence to a location that does not impede the flow of traffic.

The end result may be that the integrity of the facts known and evidence collected involving an accident may degrade over time. This situation can be especially problematic for insurance providers and their customers. For example, in the event of an automobile accident, persons involved in the accident may wish to file a claim with their insurance providers. It could be beneficial to both the insurance providers and their customers if there were a way to reliably capture relevant information at the scene of the accident and communicate this information to the claims processor for use in processing the insurance claim.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present subject matter provides benefits by providing a way to capture accident information at the scene of the accident, coordinating the capture of the information, and using the accident information to process an insurance claim. Information relating to the accident may be transmitted, stored, and used for various purposes. In one exemplary and non-limiting embodiment for recording accident information, an accident is detected, an electronic accident record storage file is created, audio, or video information, or both, relating to the accident is received, and the audio and video information is stored.

In another exemplary and non-limiting embodiment, an insurance company may process a claim by receiving a notification that an accident has occurred, transmitting a request to record information relating to the accident, receiving the information, establishing an accident record, and processing an insurance claim.

In another exemplary and non-limiting embodiment, an accident is detected, primary accident information is transmitted from a first recording apparatus, a communication link is established between the first recording apparatus and a second recording apparatus, and a request is transmitted to the second recording apparatus to transmit secondary accident information.

Other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

As discussed above, having access to information relating to an accident may be beneficial. For example, an insurance company may use information collected directly at the scene to expedite an insurance claim. In another example, to reduce fraud, an insurance company may require certain pieces of information relating to the accident to be collected and transmitted within a -4- specific period of time. At some point in time, the insurance company can compare any information submitted by a claimant with the information collected.

Having an accident record affords those that use the record an opportunity to receive information proximate to the time of the accident, rather than several days or weeks after the accident when an insurance claim is submitted or a law suit is filed.

Figure 1:
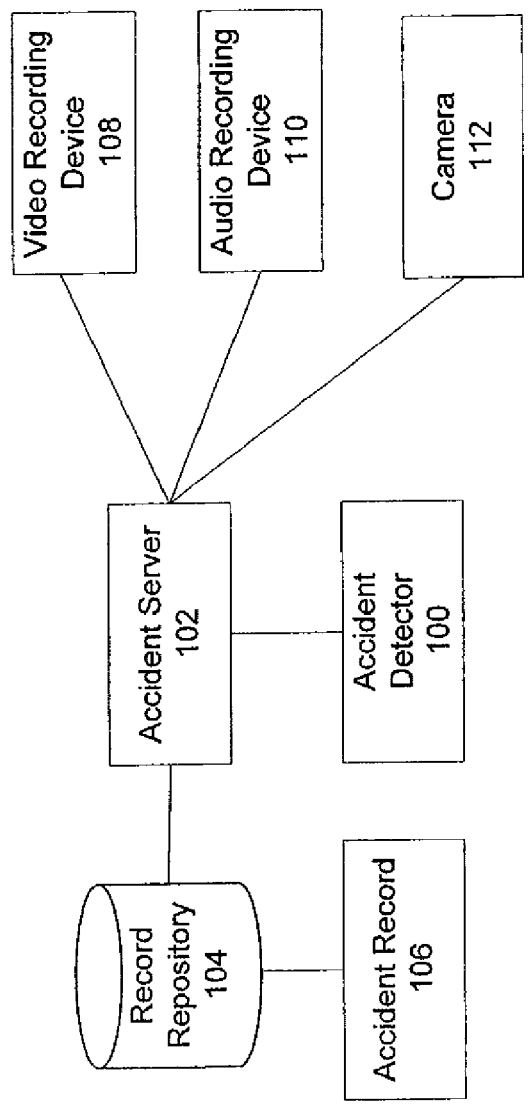
FIG. 1 is an illustration of an exemplary and non-limiting embodiment of a system for recording accident information.
Figure 2:
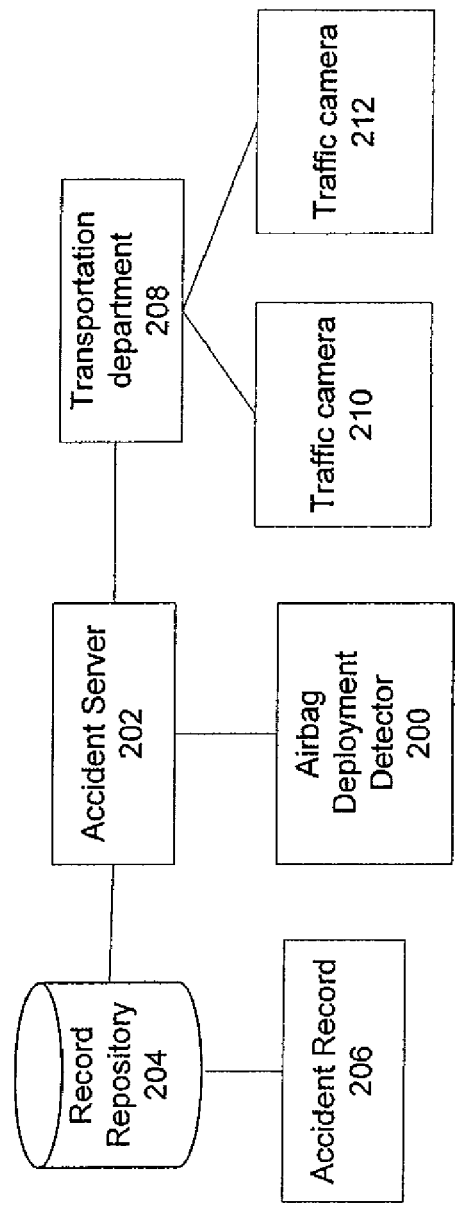
FIG. 2 is an illustration of an exemplary and non-limiting embodiment of a system for recording accident information using an airbag deployment sensor to detect an accident and traffic monitoring cameras as recording devices.

Shown in FIG. 1 is a system for creating an accident record through the recording of information relating to an accident. Accident detector 100 is configured to detect an accident situation. The present subject matter is not limited to any particular type of detector, as various detectors may be used as accident detector 100 and are considered within the scope of the present subject matter. For example, the OnStar® system, implemented by the OnStar Corporation and used in some vehicles sold by General Motors, has accident detectors situated in the automobile that, when triggered by an accident, alert a central receiving station that an accident situation may have occurred. The detectors used by OnStar® vary, but some include a sensor that one or more airbags have deployed, as illustrated in FIG. 2, an accelerometer indicating that a sudden decrease in speed has resulted, or a sensor in one or more body panels that indicate a deformation of the automobile caused by a collision. The detectors used in the OnStar® system may also be used to implement the present subject matter.

In another example, accident detector 100 may be detector that intercepts emergency signals relating to an accident. For example, detector 100 may use an emergency transmission to a police station. In some locations, when a person calls a police station notifying the police of an accident, a police dispatcher causes a transmission to be broadcast to police cars in the area. The broadcast transmission generated by the police may be used by detector 100.

Detector 100 sends a notification to accident server 102 that an accident has occurred. Accident server 102 may be a server used by various entities. For example, accident server 102 may be an "official" accident server operated by a government agency, such as the police. The police may use the accident record to supplement the information collected by a police officer at the scene of the accident. Accident server 102 may also be a "private" accident server. For example, an insurance company may coordinate the collection of accident information through accident server 102.

Accident server 102 may also be a third party organization, such as a corporation, that collects information relating to an accident and then licenses the use of that information to other businesses or entities. For example, a company may have a contract with several insurance companies. When an insurance claim relating to a particular accident is submitted to a particular insurance company, the insurance company may send an inquiry to the third party company to see if any information was submitted relating to the accident.

Accident server is configured to initiate accident record 106 in record repository 104. Accident record 106 may be configured in various manners to implement the present subject matter. For example, accident record 106 may be a main file in which information collected relating to the accident is stored. Various types of information may be stored in accident record 106. The information may be, among other things, audio recordings, videos, still pictures, scanned documents, and text. For example, during an accident, a person may use the camera function, camera 112, on their cellular phone to take and transmit pictures of the scene. The person may use the recording function of their cellular phone, audio recording device 110, to record and transmit audible statements of eye witnesses to the accident. Further, if video recording device 108 is available, the video recorded by video recording device 108 may be collected and transmitted. This information, as well as other information, may be stored in accident record 106.

There may be several sources of information available to be stored in an accident record. FIG. 2 illustrates a system in which traffic monitors may be used to supply information. Shown in FIG. 2 are accident server 202, record repository 204, and accident record 206, configured in a manner similar to that described above. For illustrative purposes, accident detector 100 is shown as airbag deployment detector 200, such as the one discussed above. To collect accident information, accident server 202 may be in communication with a transportation department. In some areas, the transportation department installs traffic monitoring cameras to help the department to monitor traffic over a wide area. Traffic cameras may often be seen along the highway in large metropolitan areas. Traffic cameras may also be seen in use in busy intersections, taking pictures of the license plates of cars that violate traffic laws. The camera may be a video or still camera.

In FIG. 2, transportation department 208 has available two cameras, traffic camera 210, and traffic camera 212. Upon receipt of a request by accident server 202 to provide information, transportation department 208 may collect and transmit information from camera 210 and camera 212 to accident server 202 for storage in accident record 206.

Figure 3:
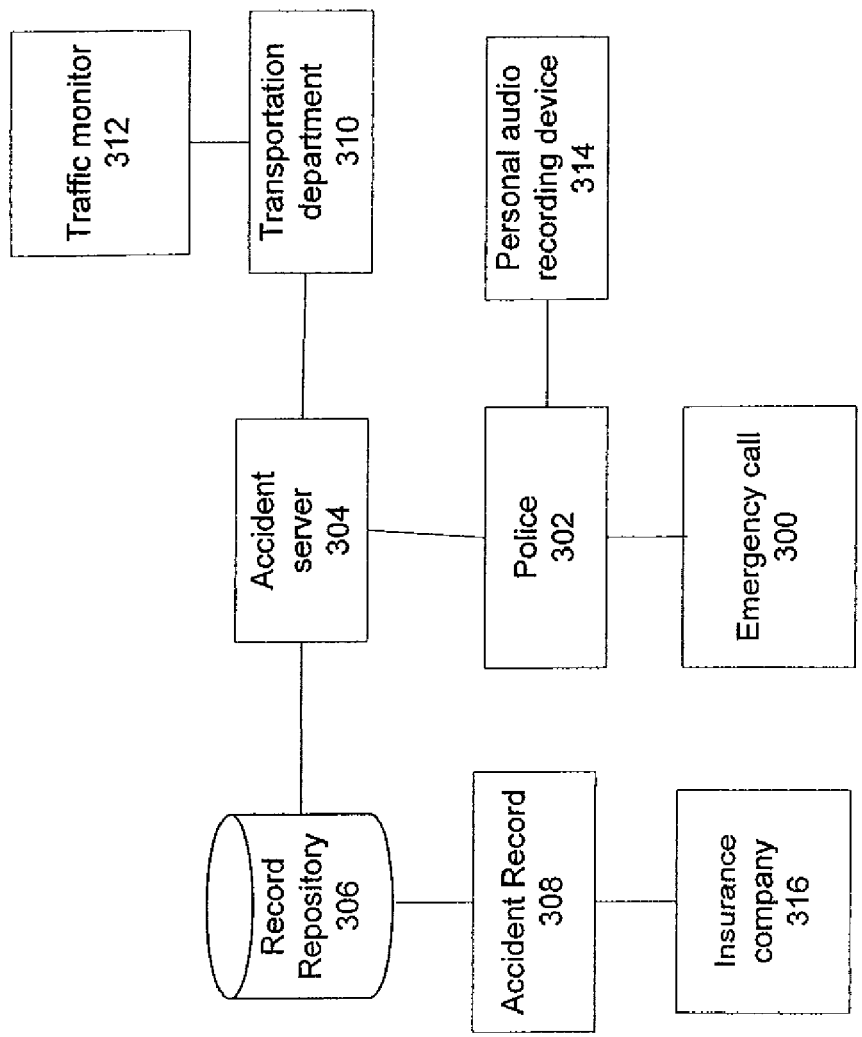
FIG. 3 is an illustration of an exemplary and non-limiting embodiment of a system in which an insurance company may access recorded accident information.

There may be other sources of information as well. FIG. 3 illustrates the use of a personal recording device to collect information. Shown are accident server 204, record repository 306, and accident record 308, configured in a manner similar as previously discussed. At the scene, a person (not shown) makes an emergency call 300 to police 302. As discussed previously, an accident detector may use emergency calls as a way to detect an accident. At the scene, police 302 takes recorded statements of those involved in the accident and any available eyewitnesses using personal audio recording device 314. Police 302 transmits the recorded information to accident server 304 for storage in accident record 308.

To supplement the information, accident server 304 may also be configured to send a request to transportation department 310 to collect and transmit information available relating to the accident. In FIG. 3, traffic monitor 312 is a traffic camera positioned in a way to take pictures of the accident scene. Transportation department 310 collects the pictures and transmits them to server 304 for storage.

In FIG. 3, because the information collected was done so by government agencies, the information collected may be public. Thus, accident record 308 may be made publicly available for use. In FIG. 3, insurance company 316 may access accident record 308 to collect information for, among other reasons, an accident claim or to investigate possible fraud.

Figure 4:
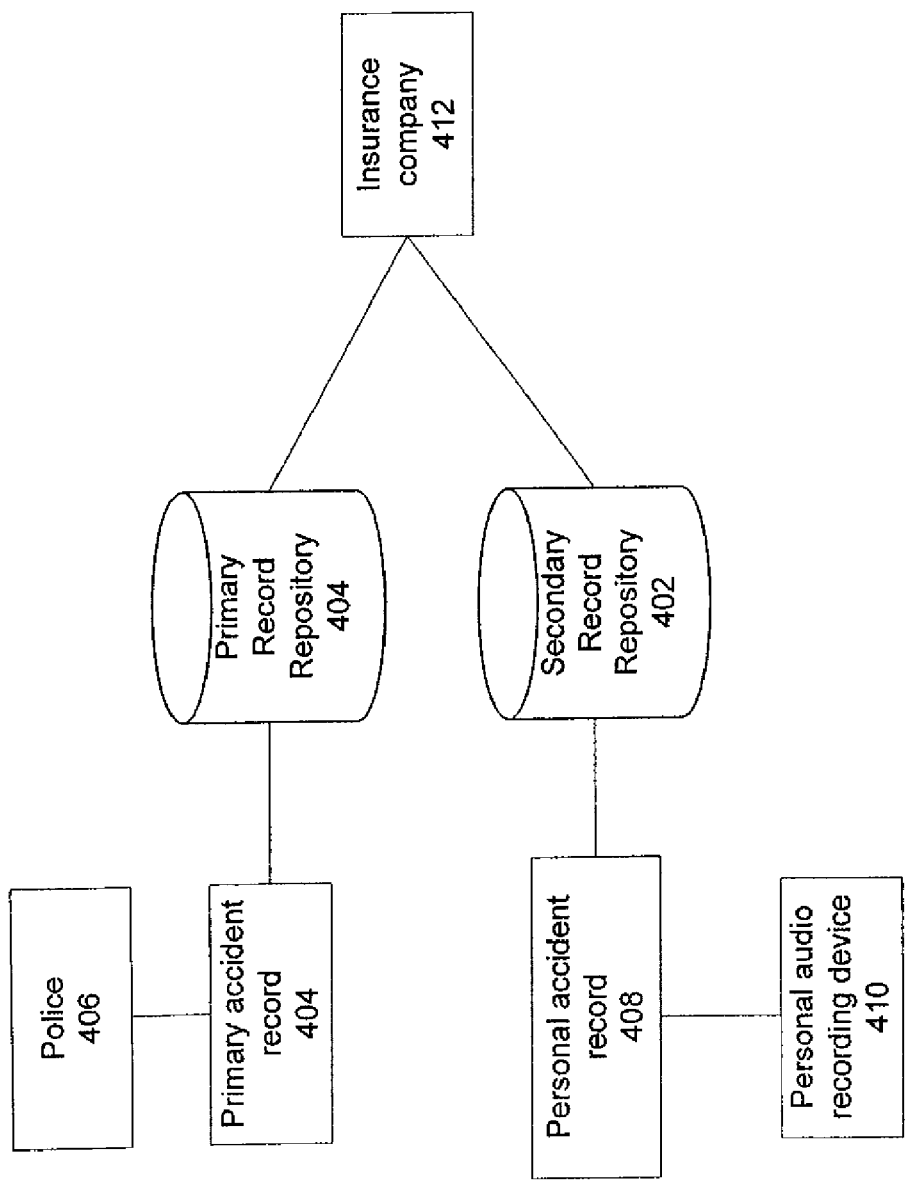
FIG. 4 is an illustration of an exemplary and non-limiting embodiment of a system in which both a government accident record and a private accident record may be used by an insurance company.

The accident record, such as accident record 308 shown in FIG. 3, may be one or more records created by one or more entities. FIG. 4 shows a system having both private and public accident records. In FIG. 4, primary accident record 404 contains information collected and submitted by a government entity, such as police 406.

Also shown is personal accident record 408, which contains information submitted by personal audio recording device 410. Information in personal accident record 408 may be submitted by, among others, a person involved in the accident. To process an insurance claim, an insurance company, such as insurance company 412, may request that information be submitted to personal accident record 408, if possible and if available. Insurance company 412, when a customer submits an insurance claim, may access primary accident record 404 and personal accident record 408 through primary record repository 404 and secondary record repository 402, respectively, to process the insurance claim.

Figure 5:
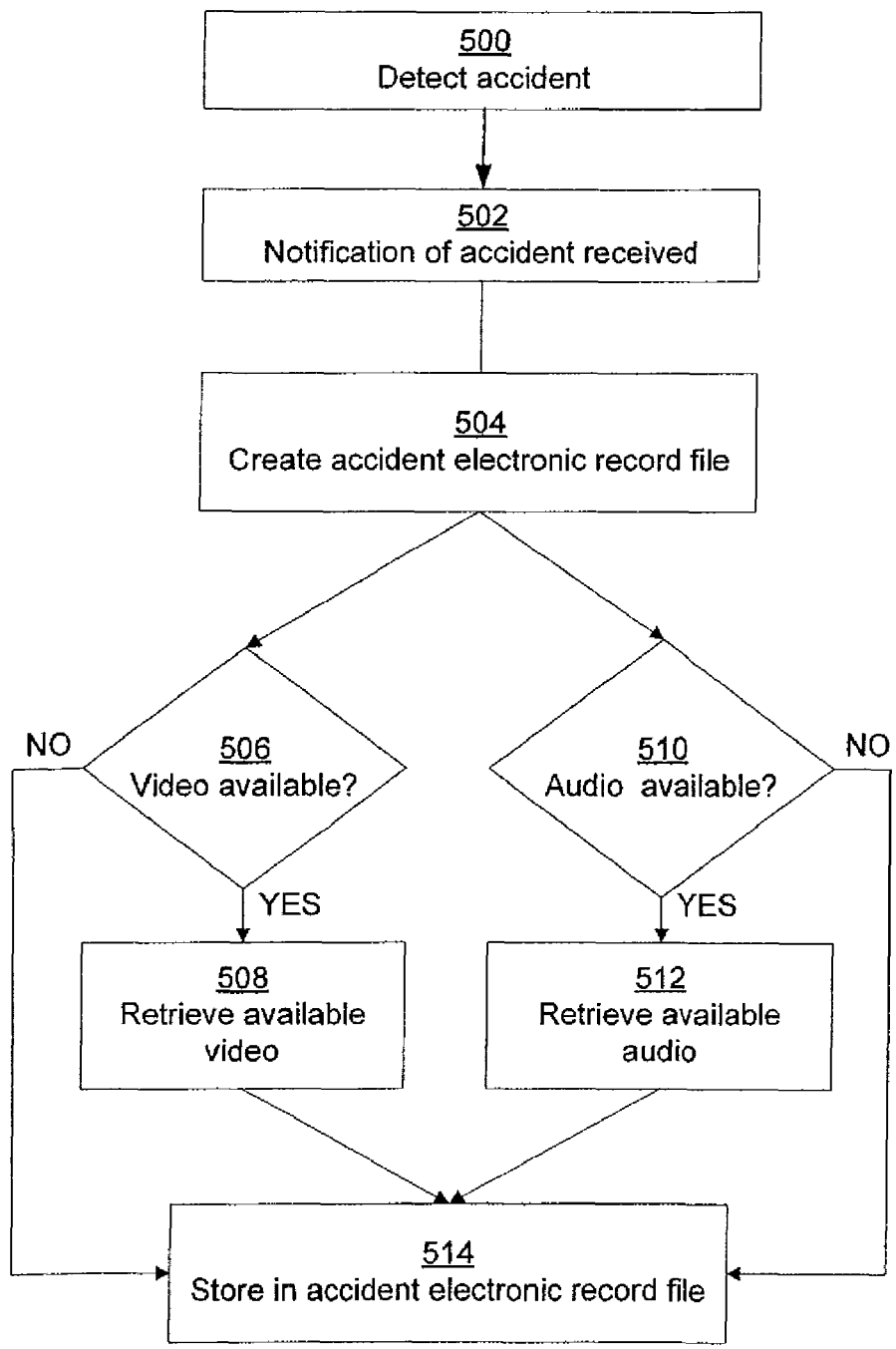
FIG. 5 is a flowchart of an exemplary and non-limiting way in which information relating to an accident may be collected.

There may be several ways in which information relating to an accident may be collected and recorded. FIG. 5 is illustrative of an exemplary and non-limiting way in which information may be collected to create an accident record. An accident is detected 500 and notification of that accident is received 502. Depending upon the manner in which the accident record is being created, the destination of the notification may vary. For example, if an insurance company was creating the accident record, the insurance company may be the intended destination for the notification. If the police was creating an accident record, a police station may be the intended destination of the notification.

An accident electronic record file is created 504. Although the accident record is shown being created after notification and before receipt of any information, it should be noted that the accident record may be created at various times, the present subject matter not being limited to any particular time. For example, when an insurance company first provides coverage for an automobile, an accident record may be created as a normal course of doing business, and stored in the insured electronic file. Thus, if an accident should occur, the accident record, already created, may be ready to receive information.

The accident record may also be created after the information is received. This may be beneficial to reduce memory usage. For example, if no information is received, the memory allocated to the accident record for possible use may be significant, unused for its intended purpose, and because the memory has been allocated for that particular accident record, unusable for other accident records. Thus, depending upon the particular system in which the present subject matter is being implemented, and the needs and limitations of the system, the accident record may be created at various times.

Referring back to FIG. 5, once the accident record is created, a request is transmitted asking if there is any video information available 506 or audio information available 510. Although FIG. 5 shows a request for audio and video, as discussed above, other information may also be available. The request may be a general request for any information, or the request may be a request for a specific type of information.

If video information is available, the video information is retrieved 508. If audio information is available, the audio information is retrieved 512. Once retrieved, the information may be stored 514 in the accident record. If no information is available, an indication of that may also be stored in the accident record.

Figure 6:
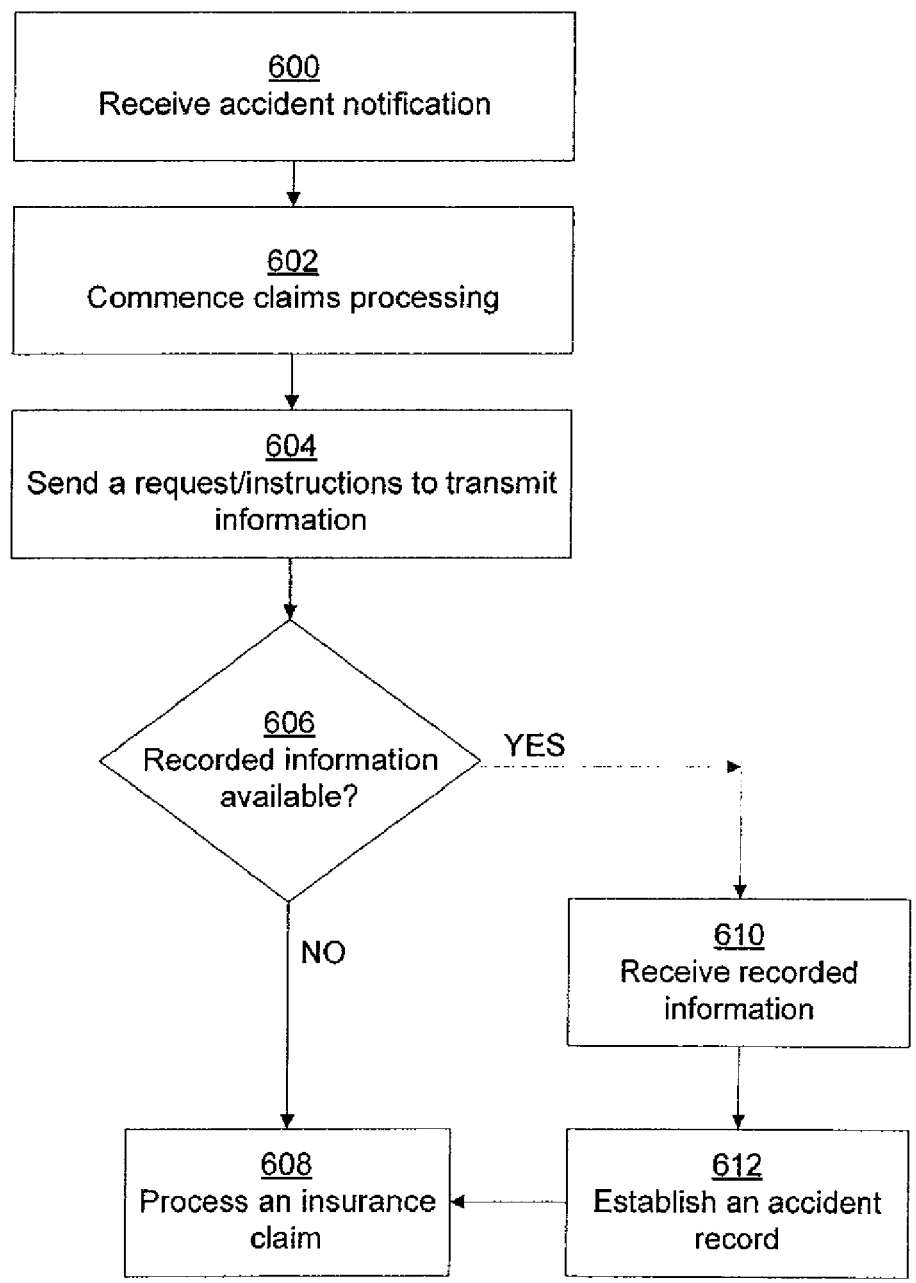
FIG. 6 is a flowchart of an exemplary and non-limiting way in which an insurance claim may be processed using recorded accident information.

As discussed previously, an insurance company may use the information recorded for various reasons, including claims processing. FIG. 6 is an exemplary and non-limiting way in which an insurance company may use recorded information to process an insurance claim. After an accident notification is received 600, the insurance company may commence 602 the claims process. An insurance company may handle claims processing in various manners. For example, and as shown in FIG. 6, the insurance company may begin the claims process prior to receipt of an insurance claim. This may be beneficial, as it may allow the insurance company to disburse claims benefits quicker, and by using information collected proximate to the time of the accident, the information relied upon by the insurance company to process the insurance claim may be factually more accurate.

Additionally, an insurance company may also commence processing an insurance claim after the receipt of an accident notice because the magnitude of an accident that may cause the generation of an accident notice may be great enough that it is likely an insurance claim will follow. In minor accidents, those involved may never wish to have the insurance company involved, instead deciding to handle the matter privately between the affected parties to the accident. The amount of money necessary to repair damages may be less than a deductible and not worth a potential increase in insurance premiums. On the other hand, as costs of the accident increase, the likelihood that an accident may cause the detection of the accident to occur and that a claim may be filed increase as well, Returning back to FIG. 6, after the claims processing has commenced, a request and/or instructions are transmitted 604 to record information. For example, if an insured wishes to expedite the claims processing, the insured may be required to record and transmit certain information, such as pictures of the accident and recorded statements. To assist the user in collecting information, instructions may be sent to the user's cellular phone or provided by some other means, such as a claims process card to be kept in the user's possession. The request may also be transmitted to local government agencies such as the police or transportation department.

If there is information, the information is received 610 and an accident record is established 612. The insurance company may then process the claim 608 using the information. If there is no information, the insurance company may still process the claim 608 but may do so in a manner that reflects the fact that no information was received.

To attempt to get the most information possible, an ad hoc network may be established between two or more communication devices. An ad hoc network is a decentralized network that may be initiated between to communication-enabled devices without the aid of a central server. For example, two laptop computers may be configured to create a network, with one of the computers acting as the serving node and the other as the subservient node. This type of network may also be available for use to collect information.

For example, onboard computers in cars are increasingly becoming more communicatively capable. Development is underway in which two cars may establish a network to coordinate the speed between the cars to avoid accidents while increasing transit speed. Additionally, the use of onboard audio and video devices in cars that can communicate with the computer is increasing. Thus, proximate to an accident, there may be one or more automobiles while information recording capabilities that are configured to be able to create or join an ad hoc communication network.

Figure 7:
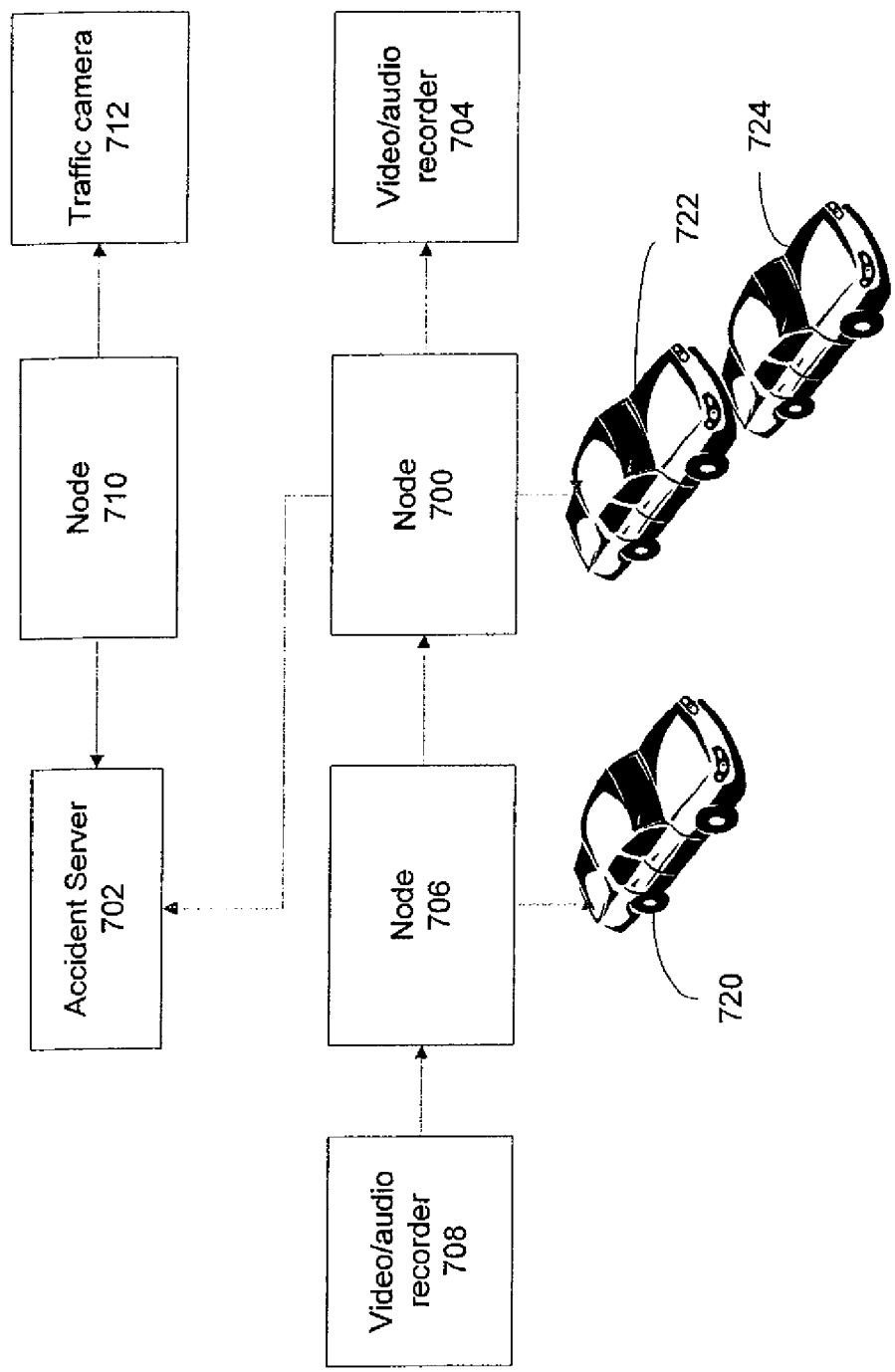
FIG. 7 is an illustration of an exemplary and non-limiting embodiment of a system in which an ad hoc network is established to record accident information.

FIG. 7 is illustrative of an exemplary and non-limiting ad hoc network. Automobile 722 and 724 have just been involved in an accident. Node 700, which is an onboard computer in automobile 722, establishes communication with accident server 702. Accident server 702 receives from node 700 video and/or audio information from video/audio recorder 704. To attempt to receive as much information as possible, accident server 702 causes the transmission of an acknowledgement ("ACK") signal (not shown) to devices proximate to the location of the accident.

Automobile 720 is shown proximate to the accident. Node 706, which is an onboard computer in automobile 720, receives the ACK and establishes an ad hoc communication network with node 700. Node 706 is then configured to transmit any information it may collect. Thus, information from video/audio recorder 708 is transmitted via the ad hoc network to node 700, which in turn transmits the information to accident server 702.

Node 710, which is a computer associated with a traffic monitoring station proximate to the accident, receives the ACK signal as well. Shown in FIG. 7, instead of connecting with node 700, node 710 instead connects with accident server 702 and transmits information collected by traffic camera 712 to accident server 702. By connecting directly with the accident server, the amount of bandwidth required for use by node 700 may be reduced. Further, if the integrity of node 700 is decreased, such as a result of damage from the accident, the information may bypass the possible damaged chain of the network.

Figure 8:
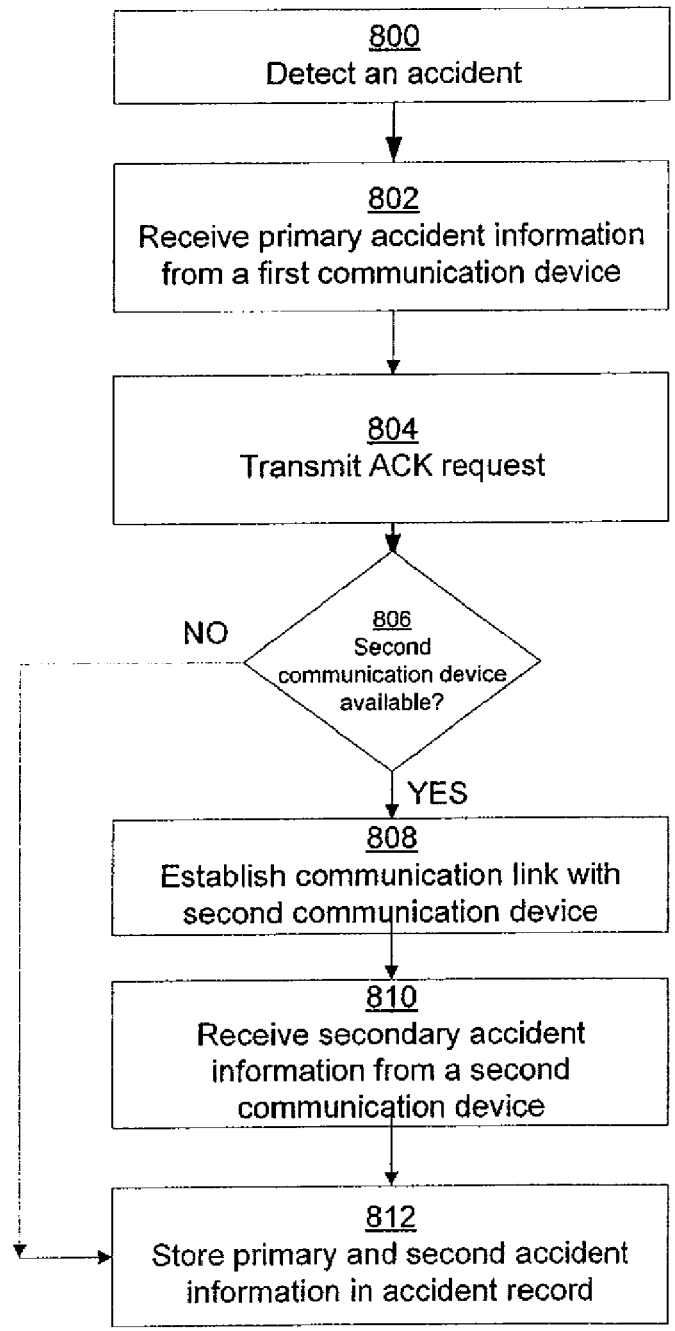
FIG. 8 is a flowchart of an exemplary and non-limiting way in which an ad hoc network may be established to collect accident information.

FIG. 8 is an exemplary and non-limiting way in which an ad hoc network may be used to collect accident information. An accident is detected 800 and primary accident information from a first communication device is received 802, for example, from node 700. An ACK is transmitted 804 and if a second communication device is available 806, a communication link is established with the second device 808, for example, node 706. Secondary information is received from the second communication device 810 and primary and secondary accident information is stored 812 in the accident record. If no second communication device is available, the first information is stored in the accident file 812.

The methods and apparatus of the present subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the functionality of the present subject matter.

While the present subject matter has been described in connection with the preferred embodiments of the various figures, it is to be understood that other similar embodiments may be used or modifications and additions may be made to the described embodiments for performing the same function of the present subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present subject matter should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present subject matter should not be limited to specific embodiments described herein but instead construed most broadly.

What is claimed:

1. A system comprising:
 a first node configured to be installed in a first vehicle, wherein the first node is configured to:
  receive, from a sensor installed in the first vehicle, an indication of a magnitude of an impact of an accident involving the first vehicle; and
  cause, based on the magnitude, an accident server external to the first vehicle to transmit a signal to devices proximate to a location of the accident; and
 a second node configured to be installed in a second vehicle that was not involved in the accident, wherein the second node is configured to:
  establish, based on the signal from the accident server, an ad hoc network with the first node;
 wherein the first node is further configured to receive, via the ad hoc network, data associated with the accident and receive, in response to the signal and via the accident server, data associated with the accident from a third vehicle that was involved in the accident.

2. The system of claim 1, wherein the first node is further configured to transmit, to the accident server, the data associated with the accident.

3. The system of claim 1, wherein the data associated with the accident comprises at least one of an audio recording, a video recording, or weather information.

4. The system of claim 3, wherein the audio recording is generated by a mobile device in communication with the second node.

5. The system of claim 1, wherein the first node is further configured to receive, from a mobile device, additional information associated with the accident.

6. The system of claim 1, wherein the first node is further configured to receive, from a traffic control device, additional information associated with the accident.

7. The system of claim 1, wherein the first node is further configured to generate, based at least on the data associated with the accident, an accident record.

8. A first node configured to be installed in a first vehicle and comprising:
 a processor; and
 a memory storing instructions that, when executed by the processor, cause the first node to:
  receive, from a sensor installed in the first vehicle, an indication of a magnitude of an impact of an accident involving the first vehicle;
  cause, based on the magnitude, an accident server external to the first vehicle to transmit a signal to devices proximate to a location of the accident; and
  receive, in response to the signal and via an ad hoc network established by a second node installed in a second vehicle that was not involved in the accident, data associated with the accident
  receive, in response to the signal and via the accident server, data associated with the accident from a third vehicle that was involved in the accident.

9. The first node of claim 8, wherein the data associated with the accident comprises at least one of image data, video data or audio data.

10. The first node of claim 8, wherein the instructions, when executed, further cause the first node to transmit, to the accident server, data generated by the first node.

11. The first node of claim 8, wherein the instructions, when executed, further cause the first node to generate, based at least on the data associated with the accident, an accident record.

12. The first node of claim 11, wherein the instructions cause the first node to generate the accident record based at least on an indication to expedite insurance claim processing.

13. The first node of claim 8, wherein the instructions, when executed, further cause the first node to receive, from a mobile device, additional information associated with the accident.

14. A method comprising:
receiving, by a first node configured to be installed in a first vehicle and from a sensor installed in the first vehicle, an indication of a magnitude of an impact of an accident involving the first vehicle;
causing, based on the magnitude, an accident server external to the first vehicle to transmit a signal to devices proximate to a location of the accident;
receiving, in response to the signal and via an ad hoc network established by a second node installed in a second vehicle that was not involved in the accident, data associated with the accident; and
receiving, in response to the signal and via the accident server, data associated with the accident from a third vehicle that was involved in the accident.

15. The method of claim 14, further comprising transmitting, to the accident server, the data associated with the accident.

16. The method of claim 14, wherein the data associated with the accident comprises at least one of an audio recording, a video recording, or weather information.

17. The method of claim 16, wherein the audio recording is generated by a mobile device in communication with the second node.

18. The method of claim 14, further comprising receiving, from a mobile device, additional information associated with the accident.

19. The method of claim 14, further comprising receiving, from a traffic control device, additional information associated with the accident.

20. The method of claim 14, further comprising generating, based at least on the data associated with the accident, an accident record.

* * * * *